(12) United States Patent
Shah

(10) Patent No.: US 6,801,881 B1
(45) Date of Patent: Oct. 5, 2004

(54) METHOD FOR UTILIZING WAVEFORM RELAXATION IN COMPUTER-BASED SIMULATION MODELS

(75) Inventor: Sunil C. Shah, Los Altos, CA (US)

(73) Assignee: Tokyo Electron Limited, Tokyo (JP)

( * ) Notice: Subject to any disclaimer, the term of this patent is extended or adjusted under 35 U.S.C. 154(b) by 0 days.

(21) Appl. No.: 09/527,497

(22) Filed: Mar. 16, 2000

(51) Int. Cl.$^7$ .......................... G06F 7/60; G06F 17/10; G06F 17/50; G06G 7/48
(52) U.S. Cl. ................. 703/2; 703/7; 703/12; 703/14; 700/97; 700/105; 700/44; 700/121; 700/45
(58) Field of Search .............................. 703/2, 6, 7, 12, 703/14, 17–20; 700/44, 45, 97, 105, 121, 108, 95, 266, 28

(56) References Cited

U.S. PATENT DOCUMENTS

| | | | |
|---|---|---|---|
| 4,791,593 A | * 12/1988 | Hennion | 703/14 |
| 5,629,845 A | * 5/1997 | Liniger | 700/67 |
| 5,757,679 A | * 5/1998 | Sawai et al. | 703/2 |
| 5,880,959 A | * 3/1999 | Shah et al. | 700/97 |
| 5,933,345 A | * 8/1999 | Martin et al. | 700/44 |
| 6,047,221 A | * 4/2000 | Piche et al. | 700/44 |
| 6,110,217 A | * 8/2000 | Kazmierski et al. | 703/14 |
| 6,289,255 B1 | * 9/2001 | Shah et al. | 700/97 |
| 6,311,146 B1 | * 10/2001 | Hao et al. | 703/2 |
| 6,442,515 B1 | * 8/2002 | Varma et al. | 703/22 |

FOREIGN PATENT DOCUMENTS

JP          407175838    * 7/1995

OTHER PUBLICATIONS

Skjellum et al., Waveform Relaxation for Concurrent Dynamic Simulation of Distillation Columns, ACM 1988.*
Chalasani et al., Parallel Implementations of the Power System Transient Stability Problem on Clusters of Workstations, ACM 1995.*
Zukowski et al., Efficient Parallel Circuit Simulation Using Bounded Chaotic Relaxation, IEEE 1992.*
Chen et al., Transient Sensitivity Computation for Waveform Relaxation–Based Timing Simulaiton, IEEE 1991.*
Chang et al., Waveform Relaxation Synthesis of Distributed Lumped Network Characteristic Models, IEEE 1994.*
Waveform Relaxation Sub–Circuit Scheduling That Balances, IBM TDB NN9007270, Jul. 1, 1990.*
Parallel Waveform Relaxation Analysis of Circuits with Global Feedback, IBM TDB NN9301314, Jan. 1, 1993.*
Sub–Circuit Partitioning for Fast Gauss–Seidel Waveform Relaxation Circuit in a Parallel Processing Environment, IBM TDB NN9407199, Jul. 1, 1994.*
Adaptive Waveform Relaxation Algorithm, IBM TDB NB8406708, Jun. 1, 1984.*

* cited by examiner

Primary Examiner—W Thomson
(74) Attorney, Agent, or Firm—Blakely Sokoloff Taylor & Zafman LLP

(57) ABSTRACT

A method for designing high performance products incorporating signal processing and feedback control is disclosed. In one embodiment, a block diagram may be used for a design cycle, for design optimization, or for design estimation. The block diagram contains a set of differential equations or difference equations, and the solution of these sets of equations may be performed by commercially available software tools. In order to utilize the software tools without requiring access to source code or other descriptions of the internal structure of the tools, the system is decomposed using the technique of waveform relaxation. The decomposition using waveform relaxation operates directly to speed up the computations for the block diagram system. The remaining interprocessor communications may be held pending until the end of each iteration's calculations in each block, allowing the software tools to be executed on independent multiple processors. Additional low fidelity models may be added to the block diagram to accelerate the convergence. In non-stationary methods, the model representing each block may vary with each successive iteration. The variation may take the form of successively increasing the complexity and therefore the fidelity of each block with each successive iteration, starting with low fidelity models and finishing with high fidelity models.

42 Claims, 7 Drawing Sheets

METHOD FOR UTILIZING WAVEFORM RELAXATION IN COMPUTER-BASED SIMULATION MODELS

FIELD OF THE INVENTION

The present invention is in the field of methodologies for engineering design activities, and more particularly in the field of methodologies for computationally intensive signal processing design or control system design activities.

BACKGROUND OF THE INVENTION

Design of new products is becoming an increasingly complex activity because of reliance on high performance features requiring signal processing and feedback control. Many industries today also rely on complex processes to produce a product. For example, the semiconductor industry uses extremely complicated processes to produce products that typically have very narrow tolerances for final product characteristics. This situation presents a challenge for those designing products and control systems, in part because the design process is very computationally intensive. Similar challenges exist in any area where a complex product must be designed and its final characteristics tightly controlled. Current methodologies for design of products and control systems are inadequate in several respects. For example in the area of control of manufacturing processes or control of product behavior, standard control methods are currently used. Many modern products and manufacturing processes, however, are too complex for standard control methods to satisfactorily control them. Typical prior design methods are linear plans that do not provide alternatives required by the uncertainty of outcomes of computations and tests, and then permit planning based on resource utilization. Also, these prior methods do not incorporate actual experienced results of process execution and adjust projections accordingly.

It is difficult, if not impossible, to achieve satisfactory results using prior methods. There are many problems in applying such methods to complicated manufacturing processes or control of behavior of high performance products.

Prior methods implemented in design tools are not effective for several reasons. For example, prior design tools typically automate linear fragments of the design activity. Results of design steps are thus unknown or uncertain before the steps are actually carried out. For instance, compute time, computational errors and exceptions, and results of physical tests cannot be known in advance to aid in decision making. These prior tools require a user to make a large number of complex decisions that depend on results of many previous steps. This is a disadvantage because the user must usually possess specific knowledge or skills in order to properly use the information gained from execution of previous steps. It is a further disadvantage because intelligent decisions can only be made and incorporated after waiting for execution of design steps. No problem-specific guidance is available from prior tools for projecting with any accuracy what the results of design steps will be.

Most existing software design tools simply automate fragments of standard design methods. In general, the tools are ineffective when applied to control of design and manufacturing processes. In the conventional paradigm, scientists, process experts, and control experts work within different domains with different tools. Scientists typically operate in the domain of physical models using a tool such as Fortran TWOPNT 106 (Grcar, J., The TWOPNT Program for Boundary Value Problems, Sandia National Laboratories, SAND 91-8230, April, 1992). Process experts typically deal with the domain of process monitoring using a tool such as Lab View® (available from National Instruments, Austin, Tex.). Control experts use tools such as MATRIXX® (available from Integrated Systems, Inc., Sunnyvale, Calif.), or MATLAB® (available from Mathworks, Inc., Natick, Mass.). Efficient control requires an integration of information from each of in an easily usable format, which typically does not occur in current design tools.

A subsystem in a simulation model may consist of components such as an actuator in a reactor, the reactor vessel, reacting species, and the sensors. Because different physical phenomena may have to be simulated in different subsystems, the use of specialized software for each subsystem provides significant benefits in development time and in running time. Different subsystem simulation software packages are developed by domain specialists using one or more of standard software packages. However, complete access to all internal state variables of each subsystem along with its data flow is needed for integration of a complete and accurate system simulation.

The integration of information is prevented by the use of separate standard software packages such as those mentioned above. Without integrating the several software packages at the level of states of each subsystem, it is necessary to take very small steps during each iteration. The models in taking small steps may thereby exchange data in near real time. Each model will calculate its data in the small steps and wait for the slowest model to complete. The models may then exchange their data as necessary. This method has the disadvantage of very slow operation.

In order to integrate the use of several standard software packages, it would be necessary to have access to the source code of the packages or at least have access to the data structures internal to the packages. It is seldom possible to have the source code or the data structures internal to the software packages.

SUMMARY AND OBJECTS OF THE INVENTION

The present invention provides a method for designing high performance products incorporating signal processing and feedback control. In one embodiment, a block diagram may be used for a design cycle, for design optimization, or for design estimation. The block diagram contains a set of differential equations or difference equations that must be solved. The solution of these sets of equations may be performed by commercially available software tools. There will typically be more than one software tool used in a block diagram system, with a software tool dedicated to each block. In order to utilize the software tools without requiring access to source code or other descriptions of the internal structure of the tools, the system is decomposed using the technique of waveform relaxation. Once decomposed, the requirements for interprocessor communication are minimized.

In one embodiment, the decomposition using waveform relaxation operates directly to speed up the computations for the block diagram system, whether it is in control system design, system parameter identification, or product design cycle.

In another embodiment, the remaining interprocessor communications are held pending until the end of each iteration's calculations in each block. In this manner the software tools may be executed on independent multiple processors.

In another embodiment, additional low fidelity models are added to the block diagram to accelerate the convergence and thus reduce the number of successive iterations required for a given final accuracy.

In another embodiment, non-stationary waveform relaxation methods are used. In non-stationary methods, the model representing each block may vary with each successive iteration. The variation may take the form of successively increasing the complexity and therefore the fidelity of each block with each successive iteration, starting with low fidelity models and finishing with high fidelity models. This advantageously gives fast convergence in early iterations and good accuracy in later iterations.

DETAILED DESCRIPTION

Figure 1:
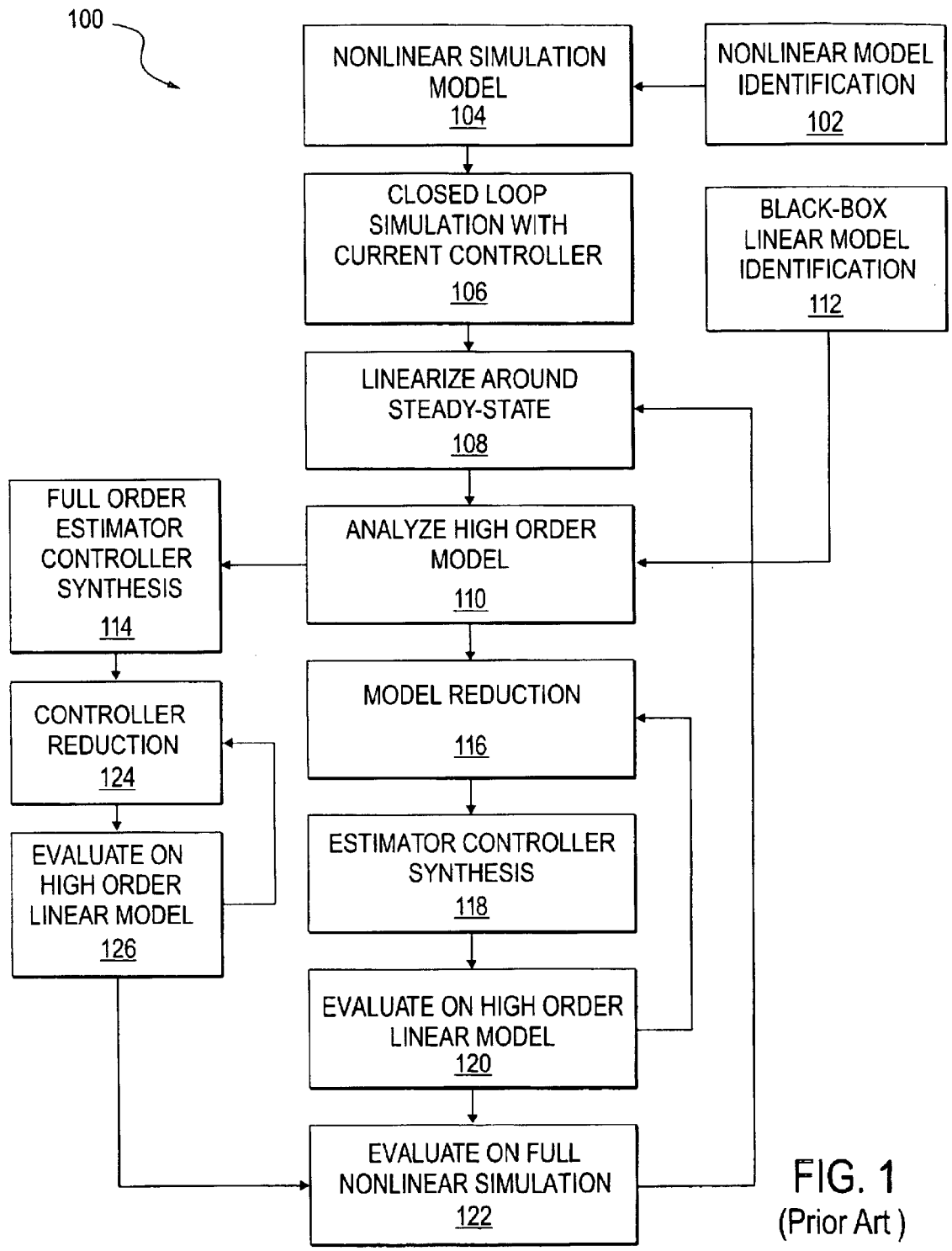
FIG. 1 is a diagram of the logical structure of a design cycle according to one embodiment.

In the following description, for purposes of explanation, numerous specific details are set forth in order to provide a thorough understanding of the present invention. It will be evident, however, to one skilled in the art that the present invention may be practiced without these specific details. In some instances, well-known structures and devices are shown in block diagram form, rather than in detail, in order to avoid obscuring the present invention. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented by an apparatus for performing the operations herein. This apparatus may be specially constructed for the required purposes, or it may comprise a general purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general purpose processor or by any combination of hardware and software. One of skill in the art will immediately appreciate that the invention can be practiced with computer system configurations other than those described below, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network. The required structure for a variety of these systems will appear from the description below.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application . . . ), as taking an action or causing a result. Such expressions are merely a shorthand way of saying that execution of the software by a computer causes the processor of the computer to perform an action or produce a result.

FIG. 1 is a diagram of the logical structure of an example design cycle 100 of one embodiment, which represents a design cycle for a process controller. Design cycle 100 includes major steps for design of a controller for a thermally activated process. In this embodiment, the thermally activated process is silicon oxide growth carried out in an oxidation furnace as in the semiconductor industry. Typically, during higher level iterations involving implementation and model refinement, the steps of design cycle 100 will be executed many times.

Referring to FIG. 1, nonlinear model identification step 102 comprises: 1) estimating uncertain parameters in a hypothesized set of ordinary nonlinear parameterized differential equations using test signals; 2) examining the validity of the hypothesized model; and 3) refining the structure and test trajectories to attain the desired degree of predictability from the nonlinear model.

Nonlinear simulation model step 104 comprises creating a computational simulation model consisting of a set of nonlinear ordinary differential equations such that the computational model can numerically integrate the equations given initial states, input signals and noise process trajectories. Closed loop simulation with a current controller step 106 includes a computational dosed loop simulation model where a set of control loops with a currently existing controller are closed around the nonlinear simulation model of step 104.

Step 108 of linearizing around a steady-state includes computing a steady-state condition of the closed loop simulation with the current controller, then computing the linearized differential equations around the steady-state condition by numerical differentiation of nonlinear simulation model 104.

Step 110 of analyzing the high order model comprises computing the multivariable frequency responses, step responses, responses to stochastic noise processes and eigenvalues of the linearized differential equations from step 108. In step 110, a black-box linear model previously identified in step 112 is used.

Step 112, black-box linear model identification comprises estimation of parameters in a set of linear difference equations.

Model reduction step 116 comprises computing an approximate model of the linear high order model of step 108 with a fewer number of states than the high order model. This may also provide an estimate of errors due to the approximation.

Estimator controller synthesis step 118 comprises computing an estimator controller that optimizes certain properties, such as the H2, H-infinity or the Mu norm of the dosed-loop system consisting of the reduced order model from step 116 and the estimator controller.

At step 120, the step of evaluating on the high order linear model includes computing multivariable frequency responses, step responses, responses to the stochastic noise processes, eigenvalues and measures of robustness for the closed system consisting of the high order model from step 108 and the estimator controller from step 118.

Full order estimator controller synthesis step 114 comprises computing an estimator controller that optimizes certain properties, such as the H2, H-infinity or the Mu norm of the closed-loop system consisting of the high order model from step 108 and the estimator controller.

Controller reduction step 124 comprises computing an approximate estimator controller of the full order estimator controller of step 114 with fewer states than the full order estimator controller.

Step 126 of evaluating on the high order linear model includes computing multivariable frequency responses, step responses, responses to stochastic noise processes, eigenvalues and measures of robustness for the closed system consisting of the high order model from step 108 and the reduced order model from step 124.

Step 122 of evaluating on the full nonlinear simulation includes: 1) replacing the current controller in the closed loop simulation of step 106 with the estimator controller from step 118 or from step 124; 2) running non-linear closed-loop simulations for various initial values and perturbed model parameters.

Each step of the design cycle of FIG. 1 may potentially be executed by alternative methods. For example model reduction step 116 may be performed using the methods listed in Table 1.

TABLE 1

| Method | Applicability | Compute Costs | Reliability |
| --- | --- | --- | --- |
| Orthogonal Kalman Decomposition | Works without regard to stability. Very sensitive to scaling. | 2.6 N3 + 6.5 N2 | Poor |
| Balanced Realization | Requires stability. Gives H-infinity error bound | 50 N3 | Good |
| Schur Decomposition of Grammian Product | Requires stability. Gives H-infinity error bound | 50 N3 | Excellent |
| Hankel Norm Reduction | Requires stability. Tighter H-infinity error bounds than with Balanced Realization | 50 (N3 + (N-1)3 + (N-2)3 . . . ) | Good |
| Modal Decomposition | Does not require stability. No bounds on H-infinity errors. Relies on time scale separation | 20 N3 | Good |

In one embodiment of the present invention, a waveform relaxation method is used to solve the simultaneous systems within multiple blocks. Waveform relaxation is attractive because we can use separate solvers or integrators for each decomposed system. There is no need to access internal code information to integrate software modules. A strict input-output formalism can be maintained. This reduces the engineering time spent in software integration and permits solvers that are optimal for a given subsystem model structure. Prior art methods for large-scale simulations such as the Krylov Space Solver, used in DASPK, offer significant speed advantages but require exploiting detained structure of the underlying simulation problem in constructing preconditioners. Using waveform relaxation allows the retention of the speed advantages in simulating subsystems without the need for access to the internals of the simulation software.

An advantage of using waveform relaxation methods is that any continuation from previously computed waveforms may be computed more quickly. This allows rapid solutions for small, incremental changes in inputs, parameters, and initial conditions. In addition, multiple processor implementation is made easier because it is possible to wait for interprocessor communication until subsystem simulation of entire waveforms is completed.

Waveform relaxation may be performed using Gauss-Jacobi Theory. The Gauss-Jacobi theory utilizes matrix manipulations to convert variables for block diagram simulations. In general, the method is to decompose the original system of equations into subsystems. Each subsystem can be solved separately, assuming its input waveforms are known. During the next iteration, the new set of outputs is used to replace the older input waveforms. In the Gauss-Jacobi theory, the calculations for each iteration in each block may be advantageously completed prior to their being transmitted to the next block. In alternate embodiments, the Gauss-Seidel theory relaxation method may be used.

The conditions for convergence of the iterations, which are based on the application of a contraction mapping theorem, can be satisfied for certain decompositions of the original equations. Consider differential algebraic equations partitioned in the canonical form of Equations 1:

$$\dot{x}^k = f(x^k, x^{k-1}, z^k, z^{k-1}, u); \quad x^k(0) = x(0)$$
$$z^k = g(x^k, x^{k-1}, z^{k-1}, u) \qquad \text{Equations 1}$$

where $x^k$, $z^k$, and u are real vectors of length n, l, and r, respectively.

If the inputs u are piece-wise continuous and the functions f and g are Lipschitz continuous and globally contractive with respect to the iteration variables (x, z), then the waveform relaxation iterations converge as $k \to \infty$ uniformly to those shown in Equations 2:

$$\dot{\hat{x}} = f(\hat{x}, \hat{x}, \hat{z}, \hat{z}, u); \quad \hat{x}(0) = x(0)$$
$$\dot{\hat{z}} = g(\hat{x}, \hat{x}, \hat{z}, \hat{z}, u); \quad t \in [0, T] \qquad \text{Equations 2}$$

For differential equations in non-normal form, diagonal dominance conditions and Lipschitz continuity are sufficient.

As an example, for open-loop simulation of thermal conduction-radiation models, the structure of the equations resulting from finite difference approximation of transient energy balance equations is given by Equation 3:

$$C(x)\frac{dx}{dt} = f(x, u(t)), \quad x(0) = x0 \qquad \text{Equation 3}$$

Diagonal dominance of the thermal mass matrix $C(x)$ is trivially satisfied in thermal conduction-radiation models. This property allows, if desired, breaking up of the open-loop simulation model into subsystems as fine as one node.

When dynamic control feedback equations are augmented to these non-normal differential equations, the resulting equations have the structure shown in Equations 4 below:

$$C(x)\frac{dx}{dt} = f(x, x_c), \quad x(0) = x0 \qquad \text{Equations 4}$$
$$\frac{dx_c}{dt} = g(x_c, x, r(t)), \quad xc(0) = xco$$

Again, diagonal dominance of the matrix $$\begin{bmatrix} C(x) & 0 \\ 0 & I \end{bmatrix}$$

for the resulting non-normal equations is immediate from the structure. This allows the combined closed-loop system to be broken up into first order equations, and allows waveform relaxation to be performed with provable convergence properties. If discrete-time controller equations are used in place of continuous controller equations, the convergence properties still remain valid.

Waveform relaxation theory decomposition of the differential equations or difference equations within a computationally complex simulation may be used to speed up the computations.

Figure 2A:
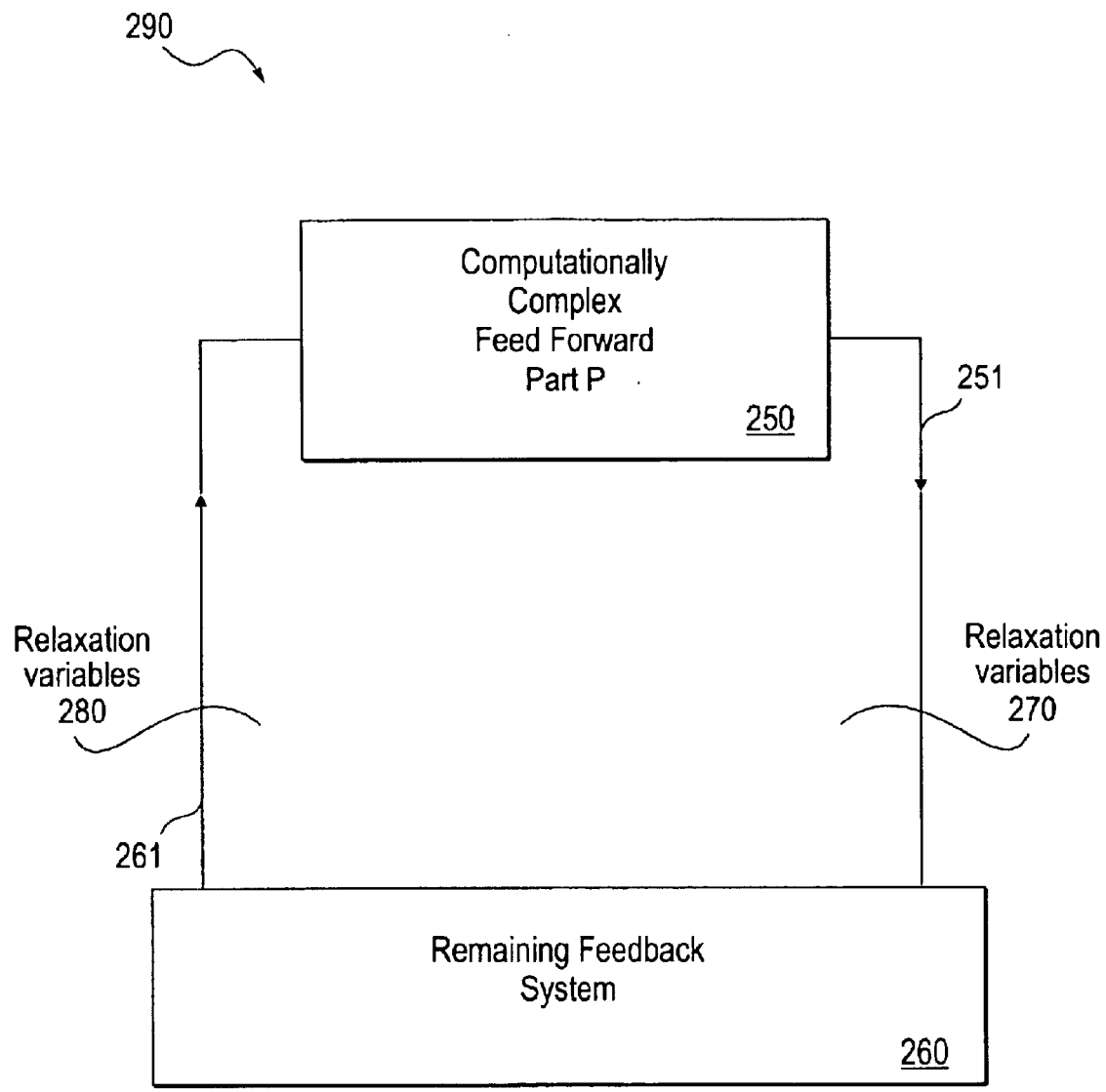
FIG. 2a illustrates a generic block diagram of waveform relaxation with strong coupling, according to one embodiment.
Figure 2B:
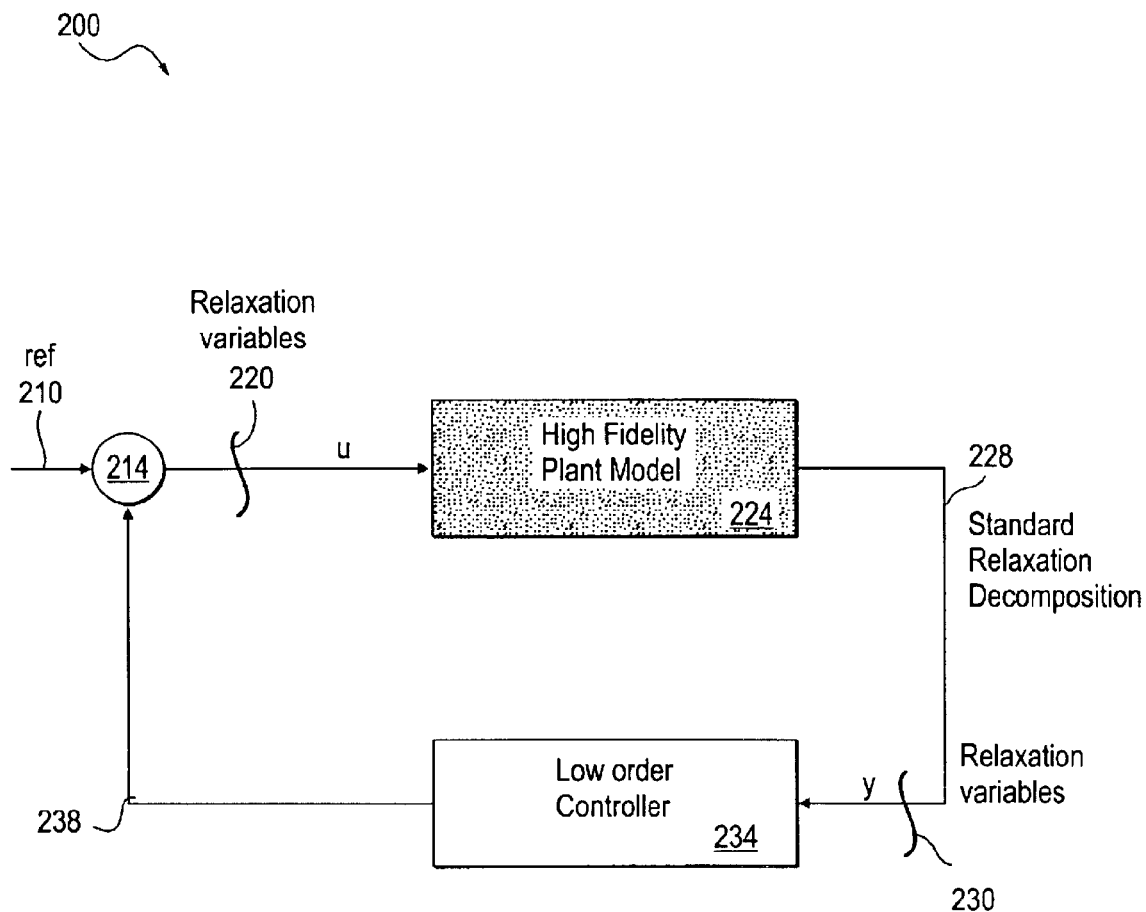
FIG. 2b illustrates a more specific example of waveform relaxation with strong coupling, according to one embodiment.

FIG. 2a and FIG. 2b are block diagrams showing a waveform relaxation method with strong coupling, according to one embodiment. FIG. 2a illustrates a generic block diagram of waveform relaxation with strong coupling and FIG. 2b illustrates a more specific example of waveform relaxation with strong coupling.

It should be noted that FIG. 2a represents a generic block diagram illustrating a waveform relaxation method in a system with strong coupling. The generic illustration of FIG. 2a is used herein to demonstrate the breadth of scope of the present invention. FIG. 2b, discussed below, is a more specific example of a block diagram illustrating a waveform relaxation method in a system with strong coupling. FIG. 2b is not meant to be limiting on the scope of the present invention and is meant merely to be exemplary.

In the more general embodiment of FIG. 2a, the present invention is used in order to enable faster convergence in computationally complex systems. Waveform relaxation decomposition in computationally complex systems is performed by first regularizing the algebraic loops of the system by introducing into the algebraic loop fast dynamics such as $$\frac{1}{\tau s + 1}$$

where $\tau$ is small. The system is then decomposed to the lowest level of available inputs and outputs from the existing software modules of the system.

In typical block-diagram forms used in control models, each block is in the normal form of Equations 5:

$$\dot{x}i = f_i(x_i, u_i)$$
$$y_{i=g_i}(x_i, u_i) \qquad \text{Equations 5}$$

In Equations 5, the fi are the inputs and the gi are the outputs of a given state of a block.

The connections among the blocks are given by a sparse interconnection matrix Econnect in Equation 6 below:

$$\begin{bmatrix} u_1 \\ \vdots \\ u_n \end{bmatrix} = E_{connect} \begin{bmatrix} y_1 \\ \vdots \\ y_n \end{bmatrix} + r_{external} \qquad \text{Equation 6}$$

The sparse interconnection matrix Econnect of Equation 6 is utilized to allow the use of waveform relaxation. The presence of direct feed-through terms in function g (i.e. the partial derivatives of g with respect to u being non-zero) is critical in determining the ordering of the blocks in simulations. Most block diagrams do not have algebraic loops or can be regularized so as not to have algebraic loops. Consequently, a particular sequence of block output evaluation allows the solution of all block inputs using the states and the external inputs. The sequencing results in normal form equations for the interconnected system. The reordering of blocks creates a thread or chain of computations terminating at blocks without direct feed-through terms, or at blocks with external outputs.

A natural decomposition for waveform relaxation of block diagrams may be based on inputs and outputs of subsystems. Blocks within a chain should be solved sequentially. Waveform relaxation of such subsystems only requires Lipschitz continuity of subsystem equations.

The chain of computations for the block diagram are determined based upon the dependency of the direct feed-through terms of the system. The chains of computation that have direct terms should remain as complete chains and should not be broken down. The resulting block diagram consists of a number of feedback loops, each loop consisting of a computationally complex feedforward part 250 and a feedback part 260, as shown in FIG. 2*a*.

In the example of FIG. 2*a*, a system 290 is shown as having a computationally complex feedforward part (feedforward part) 250 that is coupled to the remainder of the system 290 (remaining feedback system 260). Feedforward part 250 produces a signal 251 that is a set of output variables which are converted using waveform relaxation into relaxation variables 270 that are used by the remaining feedback system 260. Remaining feedback system 260 produces a signal 261 that may also be a set of output variables and which may also be converted into relaxation variables 280 that are used by feedforward part 250.

In the FIG. 2*b* embodiment, a control simulation 200 is shown. In alternate embodiments the blocks could describe dosed-loop simulation computations in system identification (the derivation of coefficients or other parameter estimate, or state estimate in the case of stochastic processes) or a product design cycle. The control simulation 200 contains a high fidelity plant model 224 and a low order controller 234. High fidelity plant model 224 is necessary for system accuracy. The feedback generated by low order controller 234 is sufficient for system stability. The high fidelity plant model 224 is one example of a class of objects called feed-forward elements. Similarly, the low order controller 234 is one example of a class of objects called feedback elements.

High fidelity plant model 224 operates on a signal generated from a reference input signal 210 and an error signal 238 which is combined at mixer 214. The output of mixer 214 is a set of non-relaxed variables which are converted by waveform relaxation into relaxation variables u 220. Relaxation variables u 220 serve as the input of high fidelity plant model 224 and produce an output 228. The output 228 is again transformed by waveform relaxation into relaxation variables y 230. Relaxation variables y 230 are operated upon by low order controller 234 to produce error signal 238. The transformation into waveform relaxation variables u 220 or relaxation variables y 230 may be accomplished using Gauss-Jacobi theory, as discussed above.

Figure 3:
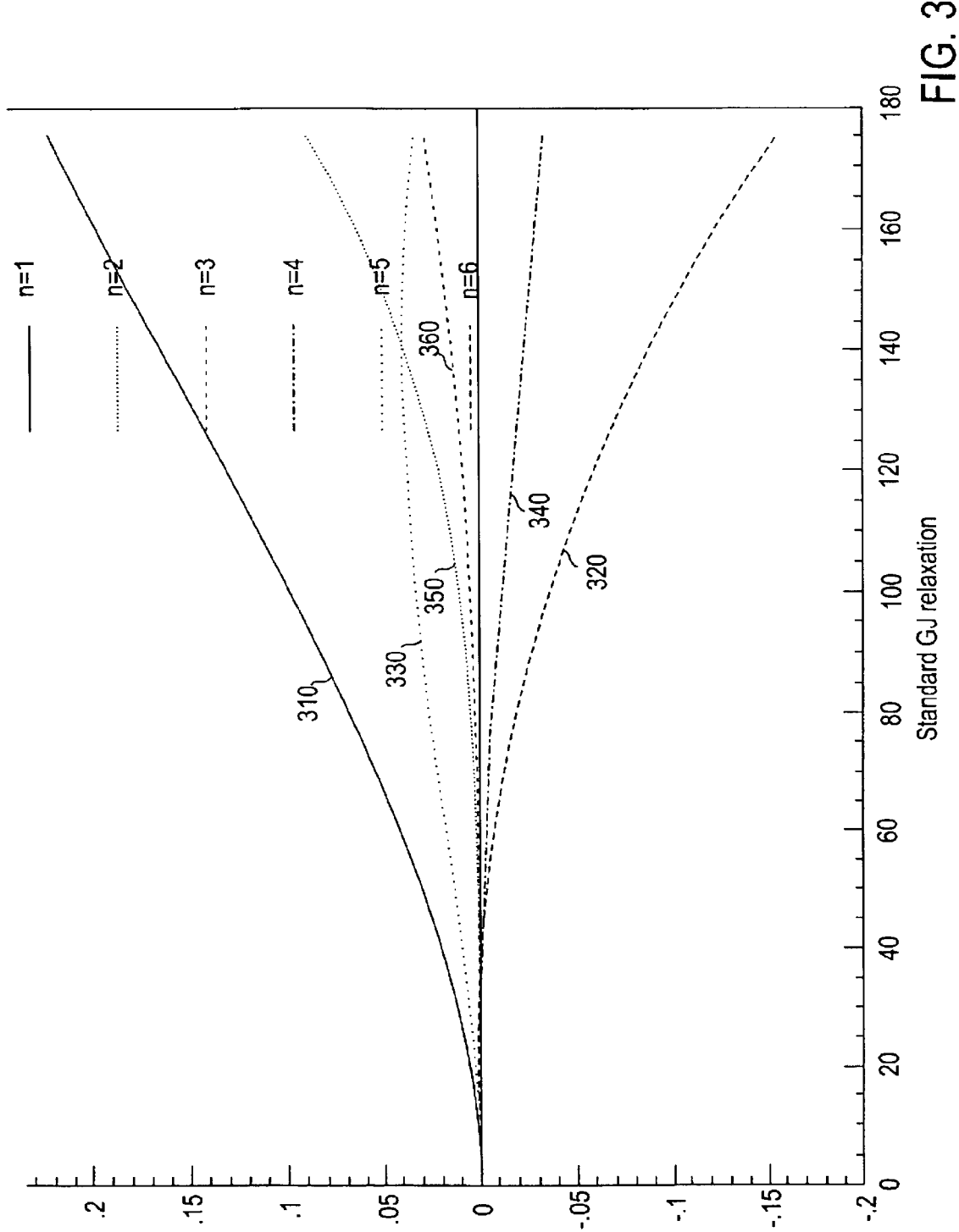
FIG. 3 is a graph showing errors in a Gauss-Jacobi waveform relaxation method, according to one embodiment.

FIG. 3 is a graph showing errors in a Gauss-Jacobi waveform relaxation method, according to one embodiment. Global convergence of Gauss-Seidel and Gauss-Jacobi waveform relaxation using the contraction mapping theorem leads to convergence in an exponentially weighted norm. However, uniform convergence over the simulation time interval with an unweighted norm is not available unless certain stronger conditions of diagonally dominant non-negative monotonicity hold. Tight coupling among decomposed subsystems slows down convergence in MOS circuit simulations.

For dosed-loop control simulations, it may be shown that, although waveform relaxation solutions do converge, unmodified waveform relaxation may require many iterations. This slow speed of convergence is a direct result of strong coupling between the plant model and the controller, as shown in FIG. 2*b* above. Strong coupling in a feedback loop occurs when loop-gain of the particular feedback loop exceeds unity. The graph of FIG. 3 shows results of Gauss-Jacobi iterations applied to a similar control system simulation. The simulations indicate slow convergence of the output waveforms.

One method to alleviate this problem is to run simulations over shorter intervals and use partial waveform convergence. However, having a greater number of time intervals increases communication overhead. In a case with a great number of very short simulation intervals, any speed advantages of waveform relaxation may be lost.

Because normal convergence is slow enough to potentially mask the performance improvements of waveform relaxation, a fast convergence technique is desirable.

Figure 4A:
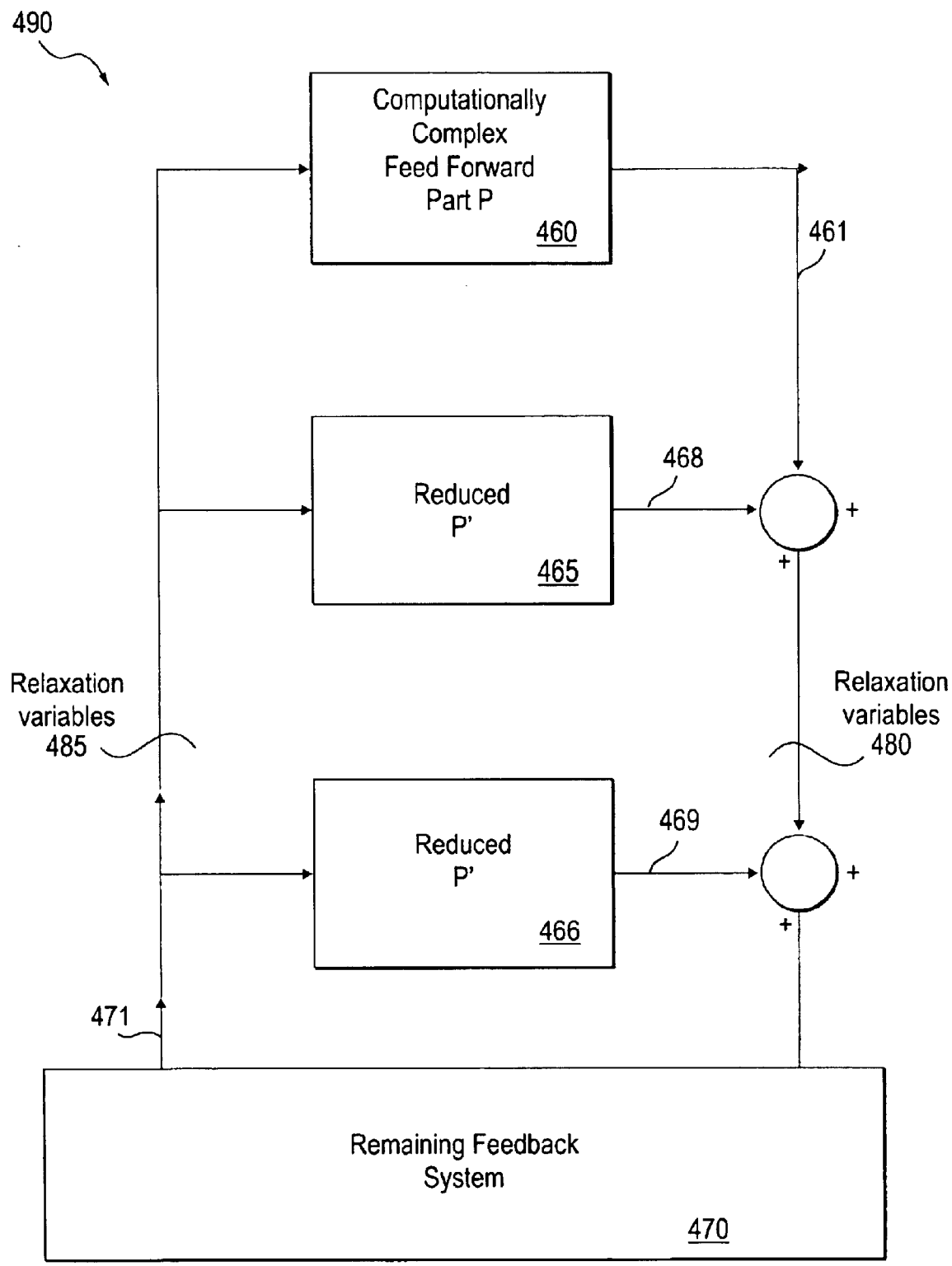
FIG. 4a illustrates a generic block diagram illustrating an accelerated relaxation decomposition method, according to another embodiment.
Figure 4B:
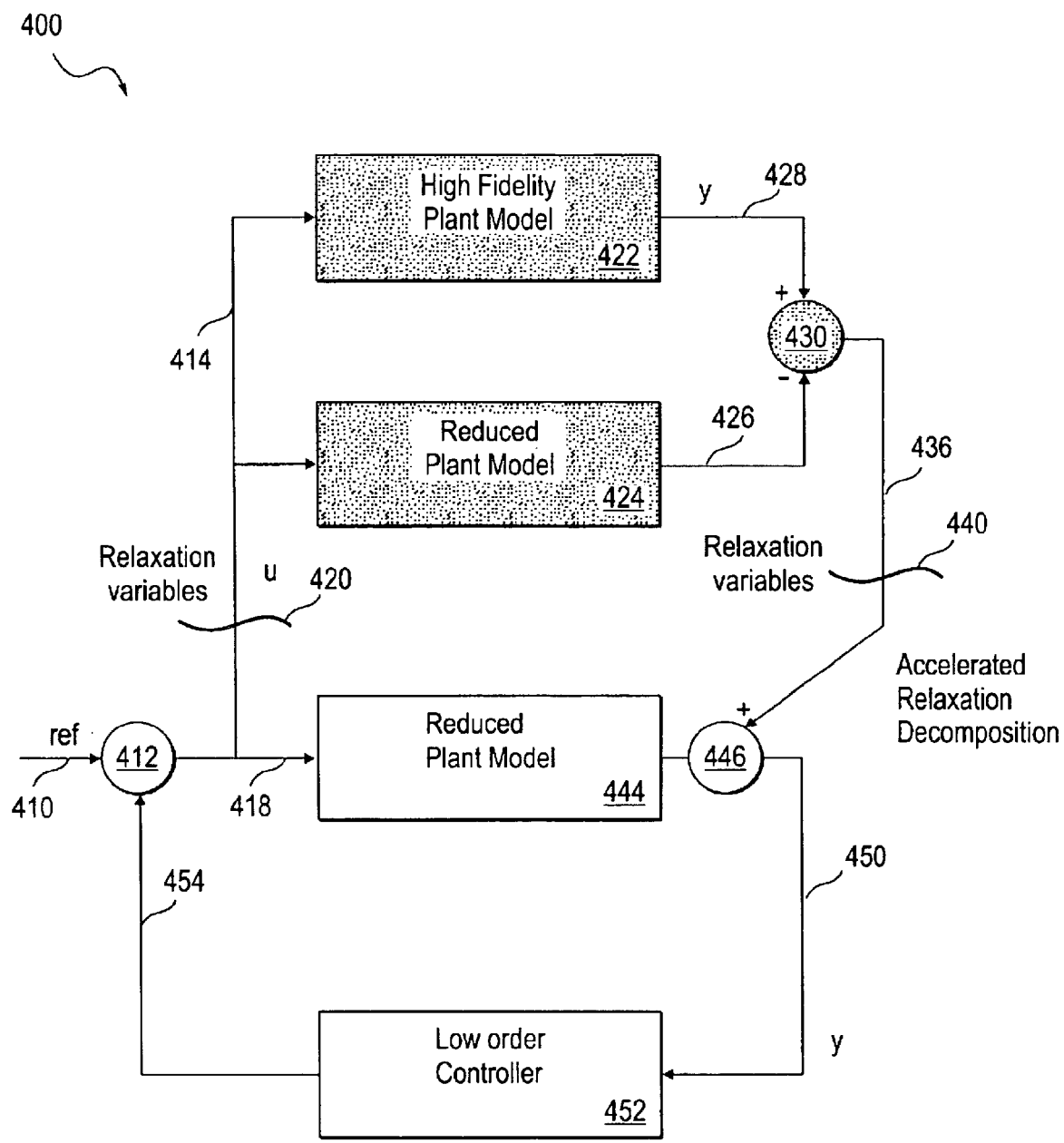
FIG. 4b illustrates a more specific example of a block diagram illustrating an accelerated relaxation decomposition method, according to another embodiment.

FIG. 4*a* and FIG. 4*b* are block diagrams showing an improved waveform relaxation method with weaker coupling, according to another embodiment. FIG. 4*a* illustrates a generic block diagram for accelerated relaxation decomposition and FIG. 4*b* illustrates a more specific example of a block diagram for accelerated relaxation decomposition.

It should be noted that FIG. 4*a* represents a generic block diagram illustrating an accelerated relaxation decomposition method. The generic illustration of FIG. 4*a* is used herein to demonstrate the breadth of scope of the present invention. FIG. 4*b*, discussed below, is a more specific example of a block diagram illustrating an accelerated relaxation decomposition method. FIG. 4*b* is not meant to be limiting on the scope of the present invention and is meant merely to be exemplary.

In FIG. 4*a*, a system 490 is shown as having a computationally complex feedforward part (feedforward part) 460, reduced model feedback parts 465, 466, which are all coupled to the remainder of the system 490 (remaining feedback system 470). Feedforward part 460 produces a signal 461 that is a set of output variables, reduced model feedforward parts 465, 466 produce signals 468, 469 that are approximations of signal 461. One or more of the signals 461, 468, and/or 469 may then be converted using waveform relaxation into relaxation variables 480 that are used by the remaining feedback system 470. Remaining feedback system 470 produces a signal 471 that is a set of output variables which are converted using waveform relaxation to into relaxation variables 485 that may be used by feedforward part 260 and reduced model feedforward parts 465, 466.

The feedback loops of the block diagram having strong coupling are identified. Feedback loops with strong coupling may simply be identified because certain feedback loops in control are expected to have strong coupling or can also be identified by discovering slow convergence under feedback in a standard relaxation simulation (as described above with regard to FIG. 2*b*). In order to reduce the strong coupling for a given feedback loop the computationally complex feedforward part 460 may be approximated by a simpler model, for example, by a reduced model feedforward part P' 465, 466 as described above, to create new relaxation variables 480 and 485.

In the FIG. 4*b* embodiment, high fidelity plant model 422 is computationally complex and so control simulation 400 exploits reduced plant models 424, 444. In this exemplary method, fast convergence arises through the use of low fidelity models 424, 444. In other words, the computationally complex plant 422 is approximated by using the simpler reduced plant models 424, 444 in order to reduce strong coupling. The approximation of complex plant 422 may be performed using model reduction techniques and/or system identification techniques. Reduced plant models 424, 444 are examples of low fidelity models.

The small errors between high fidelity plant model 422 and reduced plant models 424, 444 are only weakly coupled with the reduced closed-loop simulation. For this reason the convergence rate is greatly enhanced. Standard variables u 418 are presented to reduced plant model 444 and relaxation variables u 420 are presented to high fidelity plant model 422 and reduced plant model 424. The error signal produced by mixer 430 is used to create another set of relaxation variables 440. These relaxation variables 440 are combined by mixer 446 with the output of reduced plant model 444 to yield error signal 450. The low order controller 452 feeds back error signal 450 in the operation of control simulation 400.

Figure 5:
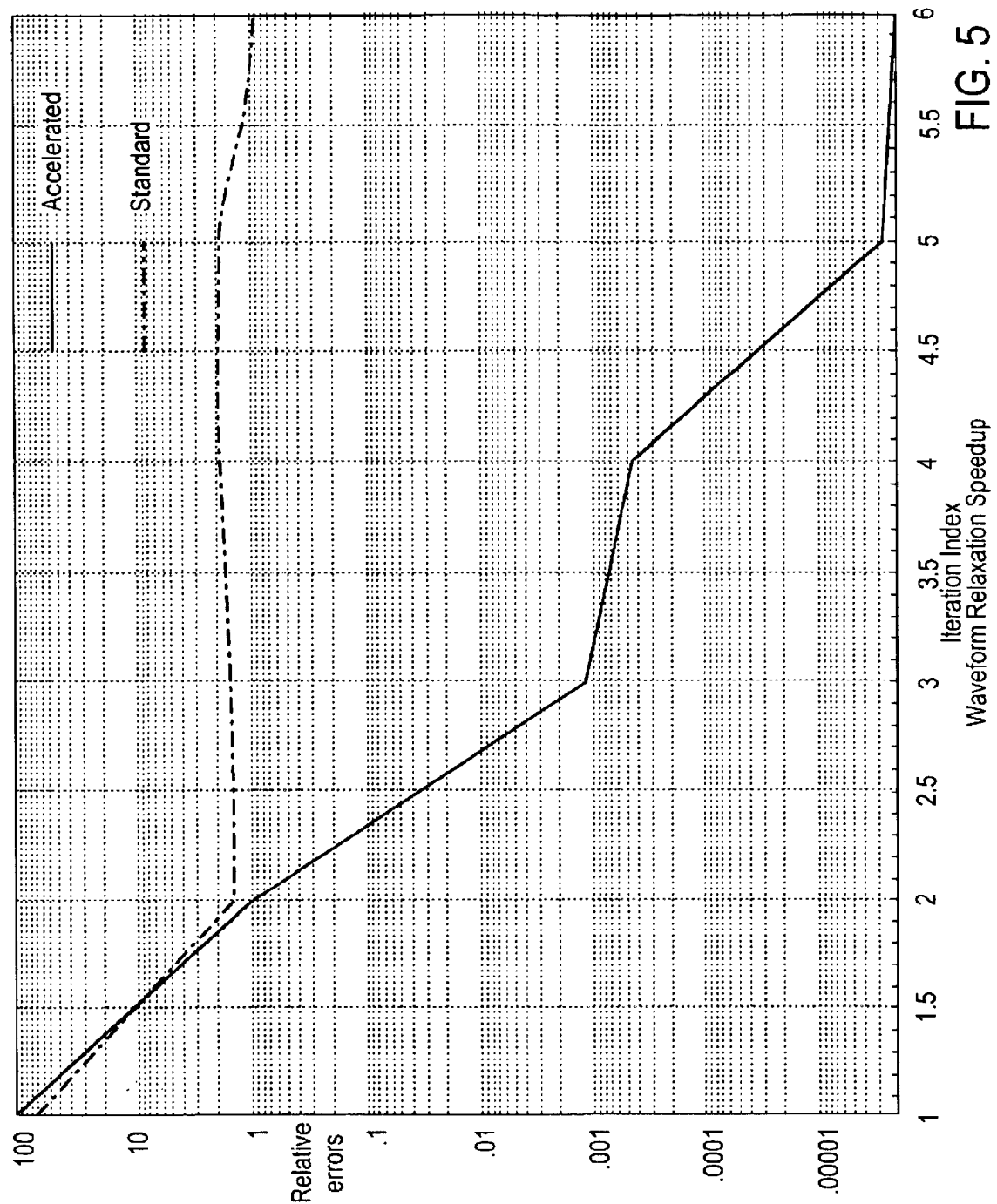
FIG. 5 is a graph showing improved convergence in a waveform relaxation method, according to another embodiment.

FIG. 5 is a graph showing improved convergence in a waveform relaxation method, according to another embodiment. In the FIG. 5 graph, the convergence of the FIG. 2b control system 200 (standard) is contrasted with the convergence of the FIG. 4b control system 400 (accelerated). Weak coupling associated with the reduced plant models 424, 444 gives faster convergence for the accelerated control system 400.

An additional benefit of the FIG. 4a and FIG. 4b decomposition methods is that the weak coupling with the waveform relaxation allows the use of multiple processors and simultaneous modeling. The solution of each block's differential equations or difference equations only weakly requires interprocessor communications. In one embodiment, the interprocessor communications may be delayed until each block's calculations are finished. In this manner the calculations for each block may be calculated separately, and therefore may be calculated on multiple processors. The calculations for the entire control system may therefore take place simultaneously.

The methods described above are called stationary waveform relaxation. The methods are stationary in that the model equations in each block do not change from one iteration to the next. In contrast, non-stationary waveform relaxation allows the model equations in each block to vary in time. Non-stationary waveform relaxation allows for further improvements in convergence speed and accuracy.

The method of non-stationary waveform relaxation operates by increasing the complexity and therefore fidelity of models with each successive iteration. In early iterations, low fidelity models are used, which contribute to-the speed of convergence. In subsequent iterations, successively higher fidelity models are used. By using successively higher fidelity models, non-stationary waveform relaxation gives the benefits of fast convergence during early iterative steps in conjunction with high fidelity and small errors in the final iterations.

Examples of models with varying fidelity include gain scheduled time series models, nonlinear black box dynamic models (including neural network structures), and nonlinear physical models with differing numbers of states.

System identification refers to the process of determining the coefficients or other parameters of the differential equations or difference equations of a block. In the case of stochastic processes, system identification may include determining state estimates. It is noteworthy that empirical models of increasing complexity and accuracy are obtained as a byproduct of the system identification process.

Another application of non-stationary waveform relaxation is in evaluating sensitivity functions for numerical trajectory optimization and system identification. One application of trajectory optimization is described in Shah et al., U.S. Pat. No. 5,517,594, FIG. 7, assigned to the assignee herein. Numerical derivatives of output trajectories may be evaluated with respect to uncertain physical parameters for system identification. Computation of numerical derivatives of output trajectories for system identification is described in System Identification, Theory for the User, Ljung, 1987, Prentice Hall, pages 282–287. To evaluate perturbed simulation trajectories, the unperturbed trajectory can be used as a starting trajectory in a waveform relaxation approach.

The present invention has been described in terms of specific exemplary embodiments. For example, various aspects of an embodiment that is used for designing a control system for a thermally activated process have been described as examples. Other embodiments of the present invention are used for design of other processes with various modifications and alterations that might be made by those skilled in the art without departing from the spirit and scope of the invention as set forth in the following claims.

What is claimed is:

1. A method for simulation modeling where the simulation model includes individual blocks in a block diagram structure wherein each of the individual blocks include equation sets of a physical model, comprising:
   configuring said blocks in a block diagram structure;
   utilizing commercial simulation software to solve said equation sets of said blocks;
   ordering said blocks in said block diagram structure to allow for waveform relaxation of sets of variables of said blocks, including
      mixing a reference input signal and an error signal to generate non-relaxed variables;
      converting the non-relaxed variables into input relaxation variables through waveform relaxation;
      processing the input relaxation variables with a high fidelity plant model,
      generating non-relaxed output variables with the high fidelity plant model,
      converting the non-relaxed output variables into output relaxation variables through waveform relaxation, and
      providing the output relaxation variables to a low order controller that generates the error signal; and
   designing the low order controller with said blocks to minimize the error signal, wherein the low order controller controls a system for manufacturing.

2. The method of claim 1, wherein ordering said blocks in said block diagram structure includes decomposing said block diagram into subsystems.

3. The method of claim 1, wherein ordering said blocks in said block diagram structure includes identifying said sets of variables of said blocks.

4. The method of claim 1, wherein ordering said blocks in said block diagram structure includes adding a low fidelity model of one of said blocks.

5. The method of claim 4, wherein adding said low fidelity model of one of said blocks includes deriving an error signal from an output of said one of said blocks and an output of said low fidelity model.

6. The method of claim 5, wherein ordering said blocks in said block diagram structure includes accelerating convergence of said simulation model by processing said error signal.

7. The method of claim 1, wherein performing waveform relaxation includes deriving a sparse interconnect matrix.

8. The method of claim 7, wherein performing waveform relaxation includes weakly-coupling said equation sets.

9. The method of claim 8, wherein utilizing said commercial simulation software includes running said commercial simulation software on a plurality of data processors.

10. The method of claim 9, running said commercial software on said plurality of data processors includes waiting until each of said commercial simulation software has completed calculations before transmitting interprocessor communications data.

11. The method of claim 1, wherein said equation sets change in subsequent iterations of said simulation model.

12. The method of claim 11, wherein said equation sets increase in fidelity in subsequent iterations of said simulation model.

13. The method of claim 1, wherein performing waveform relaxation utilizes Gauss-Jacobi methods.

14. The method of claim 1, wherein performing waveform relaxation utilizes Gauss-Seidel methods.

15. A computer readable medium having stored thereon instructions which when executed in a computer system, cause the computer system to perform:
configuring said blocks in a block diagram structure;
utilizing commercial simulation software to solve said equation sets of said blocks;
ordering said blocks in said block diagram structure to allow for waveform relaxation of sets of variables of said blocks, including
mixing a reference input signal and an error signal to generate non-relaxed variables,
converting the non-relaxed variables into input relaxation variables through waveform relaxation,
processing the input relaxation variables with a high fidelity plant model,
generating non-relaxed output variables with the high fidelity plant model,
converting the non-relaxed output variables into output relaxation variables through waveform relaxation, and
providing the output relaxation variables to a low order controller that generates the error signal; and
designing the low order controller with said blocks to minimize the error signal, wherein the low order controller controls a system for manufacturing.

16. The computer readable medium of claim 15, further having stored thereon computer-readable instructions, which when executed in the computer system for ordering said blocks in said block diagram structure, cause the computer system to perform decomposing said block diagram into subsystems.

17. The computer readable medium of claim 15, further having stored thereon computer-readable instructions, which when executed in the computer system for ordering said blocks in said block diagram structure, cause the computer system to perform identifying said sets of variables of said blocks.

18. The computer readable medium of claim 15, further having stored thereon computer-readable instructions, which when executed in the computer system for ordering said blocks in said block diagram structure, cause the computer system to perform adding a low fidelity model of one of said blocks.

19. The computer readable medium of claim 18, further having stored thereon computer-readable instructions, which when executed in the computer system for adding said low fidelity model of one of said blocks, cause the computer system to perform deriving an error signal from an output of said one of said blocks and an output of said low fidelity model.

20. The computer readable medium of claim 19, further having stored thereon computer-readable instructions, which when executed in the computer system for ordering said blocks in said block diagram structure, cause the computer system to perform accelerating convergence of said simulation model by processing said error signal.

21. The computer readable medium of claim 15, further having stored thereon computer-readable instructions, which when executed in the computer system for performing waveform relaxation, cause the computer system to perform deriving a sparse interconnect matrix.

22. The computer readable medium of claim 21, further having stored thereon computer-readable instructions, which when executed in the computer system for performing waveform relaxation, cause the computer system to perform weakly-coupling said equation sets.

23. The computer readable medium of claim 22, further having stored thereon computer-readable instructions, which when executed in the computer system for utilizing said commercial simulation software, cause the computer system to perform running said commercial simulation software on a plurality of data processors.

24. The computer readable medium of claim 23, further having stored thereon computer-readable instructions, which when executed in the computer system for running said commercial software on said plurality of data processors, cause the computer system to perform waiting until each of said commercial simulation software has completed calculations before transmitting interprocessor communications data.

25. The computer readable medium of claim 15, wherein said equation sets change in subsequent iterations of said simulation model.

26. The computer readable medium of claim 25, wherein said equation sets increase in fidelity in subsequent iterations of said simulation model.

27. The computer readable medium of claim 15, wherein performing waveform relaxation utilizes Gauss-Jacobi computer readable mediums.

28. The computer readable medium of claim 15, wherein performing waveform relaxation utilizes Gauss-Seidel computer readable mediums.

29. A system for simulation modeling where the simulation model includes individual blocks in a block diagram structure wherein each of the individual blocks include equation sets of a physical model, comprising:
means for configuring said blocks in a block diagram structure;
means for utilizing commercial simulation software to solve said equation sets of said blocks;
means for ordering said blocks in said block diagram structure to allow for waveform relaxation of sets of variables of said blocks, including
means for mixing a reference input signal and an error signal to generate non-relaxed variables;
means for converting the non-relaxed variables into input relaxation variables through waveform relaxation,
means for processing the input relaxation variables with a high fidelity plant model,
means for generating non-relaxed output variables with the high fidelity plant model;
means for converting the non-relaxed output variables into output relaxation variables through waveform relaxation, and
means for providing the output relaxation variables to a low order controller that generates the error signal; and
means for designing the low order controller with said blocks to minimize the error signal, wherein the low order controller controls a system for manufacturing.

30. The system of claim 29, wherein the means for ordering said blocks in said block diagram structure include means for decomposing said block diagram into subsystems.

31. The system of claim 29, wherein said means for ordering said blocks in said block diagram structure includes means for identifying said sets of variables of said blocks.

32. The system of claim 29, wherein said means for ordering said blocks in said block diagram structure includes means for adding a low fidelity model of one of said blocks.

33. The system of claim 32, wherein said means for adding said low fidelity model of one of said blocks includes means for deriving an error signal from an output of said one of said blocks and an output of said low fidelity model.

34. The system of claim 33, wherein said means for ordering said blocks in said block diagram structure includes means for accelerating convergence of said simulation model by processing said error signal.

35. The system of claim 29, wherein said means for performing waveform relaxation includes means for deriving a sparse interconnect matrix.

36. The system of claim 35, wherein said means for performing waveform relaxation includes means for weakly-coupling said equation sets.

37. The system of claim 36, wherein said means for utilizing said commercial simulation software includes means for running said commercial simulation software on a plurality of data processors.

38. The system of claim 37, wherein said means for running said commercial software on said plurality of data processors includes means for waiting until each of said commercial simulation software has completed calculations before transmitting interprocessor communications data.

39. The system of claim 29, wherein said equation sets change in the subsequent iterations of said simulation model.

40. The system of claim 39, wherein said equation sets increase in fidelity in subsequent iterations of said simulation model.

41. The system of claim 29, wherein said means for performing waveform relaxation utilizes Gauss-Jacobi systems.

42. The system of claim 29, wherein said means for performing waveform relaxation utilizes Gauss-Seidel systems.

* * * * *

UNITED STATES PATENT AND TRADEMARK OFFICE
CERTIFICATE OF CORRECTION

PATENT NO.   : 6,801,881 B1
DATED        : October 5, 2004
INVENTOR(S)  : Sunil C. Shah It is certified that error appears in the above-identified patent and that said Letters Patent is hereby corrected as shown below:

Column 5,
Line 21, reads "...106 includes a computational dosed loop simulation model..." and should read -- ...106 includes a computational closed loop simulation model... --.
Line 49, reads "...dosed-loop system consisting of the reduced order model..." and should read -- ...closed-loop system consisting of the reduced order model... --.

Column 8,
Line 31, reads "$xi=f_i(x_i,u_i)$" and should read -- $x_i=f_i(x_i,u_i)$ --.
Line 34, reads "$y_i=g_i(x_i,u_i)$" and should read -- $y_i=g_i(x_i,u_i)$ --.

Column 9,
Line 18, reads "...dosed-loop simulation computations in system identification..." and should read -- ...closed-loop simulation computations in system identification... --.
Line 54, reads "For dosed-loop control simulations, it may be shown that,..." and should read -- For closed-loop control simulations, it may be shown that,... --.

Column 11,
Line 38, reads "...low fidelity models are used, which contribute to-the speed..." and should read -- ...low fidelity models are used, which contribute to the speed... --.

Column 12,
Line 21, reads "10. The method of claim 9, running said commercial..." and should read -- 10. The method of claim 9, wherein running said commercial... --.
Line 22, reads "...generate non-relaxed variables;..." and should read -- ...generate non-relaxed variables,... --.
Line 24, reads "...ation varables through waveform relaxation;..." and should read -- ...ation varables through waveform relaxation,...--.

UNITED STATES PATENT AND TRADEMARK OFFICE
CERTIFICATE OF CORRECTION

PATENT NO. : 6,801,881 B1
DATED : October 5, 2004
INVENTOR(S) : Sunil C. Shah

It is certified that error appears in the above-identified patent and that said Letters Patent is hereby corrected as shown below:

<u>Column 14,</u>
Line 45, reads "...signal to generate non-relaxed variables;..." and should read
-- ...signal to generate non-relaxed variables,... --.
Line 52, reads "...the high fidelity plant model;..." and should read -- ...the high fidelity plant model,... --.

Signed and Sealed this

Twenty-fifth Day of October, 2005

JON W. DUDAS
*Director of the United States Patent and Trademark Office*